(12) United States Patent
Eberth et al.

(10) Patent No.: US 8,858,218 B2
(45) Date of Patent: Oct. 14, 2014

(54) TOOL FOR A RESIN TRANSFER MOULDING METHOD

(75) Inventors: Ulrich Eberth, Donauwoerth (DE); Martin Friedrich, Harsum (DE)

(73) Assignees: Airbus Operations GmbH (DE); Deutsches Zentrum füLuft- und Raumfahrt e.V. (DLR) (DE)

( * ) Notice: Subject to any disclaimer, the term of this patent is extended or adjusted under 35 U.S.C. 154(b) by 1102 days.

(21) Appl. No.: 12/084,727

(22) PCT Filed: Nov. 7, 2006

(86) PCT No.: PCT/EP2006/010660
§ 371 (c)(1),
(2), (4) Date: Aug. 25, 2009

(87) PCT Pub. No.: WO2007/054268
PCT Pub. Date: May 18, 2007

(65) Prior Publication Data
US 2010/0019405 A1    Jan. 28, 2010

(30) Foreign Application Priority Data

Nov. 10, 2005   (DE) .......................... 10 2005 053 691

(51) Int. Cl.
| | | |
|---|---|---|
| B29C 70/48 | (2006.01) | |
| B29C 33/00 | (2006.01) | |
| B29C 37/00 | (2006.01) | |
| B29C 45/26 | (2006.01) | |
| B29C 45/34 | (2006.01) | |
| B29C 70/44 | (2006.01) | |

(52) U.S. Cl.
CPC ........... *B29C 70/443* (2013.01); *B29C 33/0055* (2013.01); *B29C 45/34* (2013.01); *B29C 70/48* (2013.01); *B29C 45/2669* (2013.01); *B29C 37/0064* (2013.01)
USPC ........................................... 425/557; 264/257

(58) Field of Classification Search
None
See application file for complete search history.

(56) References Cited

U.S. PATENT DOCUMENTS

| | | | |
|---|---|---|---|
| 3,970,732 A | | 7/1976 | Slaats et al. |
| 5,023,041 A | | 6/1991 | Jones et al. |
| 5,433,915 A | * | 7/1995 | Yamamoto et al. ........... 264/510 |
| 5,863,452 A | * | 1/1999 | Harshberger et al. ........... 249/83 |
| 7,147,818 B1 | * | 12/2006 | Rigas et al. .................... 264/510 |
| 2005/0013983 A1 | * | 1/2005 | Hilligoss .................... 428/297.4 |
| 2005/0249937 A1 | * | 11/2005 | Yamada et al. ............. 428/317.1 |

FOREIGN PATENT DOCUMENTS

| | | |
|---|---|---|
| DE | 19630840 | 2/1998 |
| DE | 10059132 | 6/2002 |
| EP | 0 230 709 | 8/1987 |

(Continued)

OTHER PUBLICATIONS

Office Action from Japanese Application No. 2008-539324, dated Aug. 23, 2011.

*Primary Examiner* — Benjamin Schiffman
(74) *Attorney, Agent, or Firm* — Lerner, David, Littenberg, Krumholz & Mentlik, LLP

(57) ABSTRACT

A tool for a resin transfer molding method comprises a cavity, a resin trap and a transition region, wherein the cavity is designed such that a component can be accommodated in it. Furthermore, the resin trap is integrated in the tool, and the transition region is designed such that with it a connection between the cavity and the resin trap can be established.

6 Claims, 4 Drawing Sheets

(56) References Cited

FOREIGN PATENT DOCUMENTS

| | | |
|---|---|---|
| EP | 0 320 302 | 6/1989 |
| FR | 2771960 | 6/1999 |
| GB | 791552 | 3/1958 |
| GB | 1008136 | 10/1965 |
| GB | 1462623 | 1/1977 |
| JP | 60-225721 | 11/1985 |
| JP | 61-144313 | 7/1986 |
| JP | 06-031755 | 2/1994 |
| JP | 6079740 A | 3/1994 |
| JP | 2002-160224 | 6/2002 |
| JP | 2005169787 A | 6/2005 |
| RU | 2080750 C1 | 5/1997 |
| RU | 2201343 C2 | 3/2003 |

\* cited by examiner

TOOL FOR A RESIN TRANSFER MOULDING METHOD

This application claims the benefit of the filing date of German Patent Application No. 10 2005 053 691.3 filed Nov. 10, 2005, the disclosure of which is hereby incorporated herein by reference.

FIELD OF INVENTION

The present invention relates to a tool for an RTM method, to a system comprising a tool for an RTM method, and to an RTM method, in particular to a tool that comprises an integrated resin trap.

BACKGROUND OF THE INVENTION

RTM methods are methods for producing fibre composite components. RTM stands for Resin Transfer Moulding and describes the method activities. Such methods are in particular suitable for the production, on an industrial scale, of components with a low ratio of surface to volume. The method is suitable for producing high-grade components with a high fibre volume content, good reproducibility and little porosity.

There may be a need to create a tool for RTM methods, an RTM method, and a system comprising a tool for an RTM method, which all meet modern requirements.

According to an exemplary embodiment of the present invention the above-mentioned need may met by a tool for a resin transfer moulding method, which tool comprises a cavity, a resin trap and a transition region, wherein the cavity is adapted such that a component can be accommodated in it. Furthermore, the resin trap is integrated in the tool, and the transition region is designed such that with it a connection between the cavity and the resin trap can be established.

According to an exemplary embodiment a system for a resin transfer moulding method comprises a tool according to an exemplary embodiment of the invention, a pump and a storage container, wherein the pump is coupled to an output connection of the resin trap, and wherein the storage container is coupled to an input connection of the cavity.

According to an exemplary embodiment a resin transfer moulding method comprises the placement of a component in a cavity of a tool, feeding of resin in the cavity of the tool, and pressurisation of a resin trap that is integrated in the tool and communicates with the cavity. Preferably, the pressure is overpressure.

A basic idea of the invention may consist of a resin trap of a tool for a resin transfer moulding method (RTM method) being integrated in the tool. In other words the resin trap may be located in the tool itself. The resin trap may thus not be an external resin trap, as known from prior art, but instead an internal resin trap.

With the use of a tool according to the invention it may be possible to save an external resin connection, which according to prior art is required in order to couple the cavity of the tool to a resin trap. In this way any occurrence of sealing problems as a result of dirty seals is possibly reduced. Since there is no need to provide an external resin trap it may also be possible to do without other connection materials, such as for example hoses and hose clamps. These are frequently made as expendable or single-use components so that not having to provide these components possibly leads to savings in materials. Furthermore, it may be possible to do without cleaning of docking parts, for example hoses or clamps and other external parts, whether cleaning be carried out manually or automatically. Similarly, the consumption of resin is possibly reduced because the additional quantities of resin, required in RTM methods according to the state of the art, for example for filling inlet pipes, can be done without. As a result of the above-mentioned simplifications, the RTM method may overall be more cost-effective, efficient, able to be automated, and less prone to errors, which may lead to good method reliability.

By means of a tool according to the invention it may be possible to circumvent problems associated with prior art. In particular, it may be possible to avoid difficult docking of resin lines, which docking often resulted in sealing problems, e.g. as a result of resin-clogged lines, as a result of which in tools according to prior art a drop in method reliability may occur. Furthermore, with a tool according to the invention it may be possible to do without some external parts, which external parts usually cause additional cleaning expenditure.

Further objects, embodiments and advantages of the invention are shown in the secondary independent claims and in the dependent claims.

Below, exemplary embodiments of the tool for an RTM method are described in more detail, wherein designs that are described in the context of the tool for an RTM method equally apply to the system comprising a tool for an RTM method, and to the RTM method.

In another exemplary embodiment the tool further comprises a mould and a mould cover, wherein the mould and the mould cover are adapted such that when the mould and the mould cover are joined, the cavity and/or the resin trap and/or the transition region are/is formed.

The design of a tool in the embodiment of a mould and a mould cover may be a particularly efficient embodiment to form a cavity into which a component can easily be placed. In this arrangement the component can easily be placed in the cavity and, after the RTM method has been completed, can easily be removed from said cavity. Likewise, subsequent cleaning may be simplified by a two-part construction of the tool.

In a further exemplary embodiment the transition region comprises a separation element, wherein the separation element is arranged between the cavity and the resin trap and is adapted such that it at least partly engages the connection between the cavity and the resin trap in such a way that the connection between the cavity and the resin trap can be closed at least in part. Preferably, the separation element is adapted such that it forms a siphon-like transition region.

By providing a siphon-like transition region it may be possible to do without a method component, e.g. a shutoff cock, as is used according to prior art. By saving method components there may be savings in the costs of the component and of the connection and the cleaning of the shutoff cock. Furthermore, in this way the number of possible error sources may also be reduced.

In another exemplary embodiment the separation element is integrated in the mould cover and/or in the mould. In other words, the separation element may be integrated solely in the mould cover, solely in the mould (bottom part of the mould) or partly in the mould cover and partly in the mould.

Accommodating or integrating the separation element in the mould cover (top part of the tool) and/or in the mould, i.e. the bottom part of the mould, or in other words the bottom part of the tool may be a particularly efficient way of separating the cavity, at least in part, from the resin trap.

In a further exemplary embodiment the separation element is a shutoff cock.

Designing the separation element as a shutoff cock may be a particularly effective option for obtaining an interruption of the connection between the hollow space or cavity and the resin trap.

According to another exemplary embodiment the tool further comprises a control connection that is adapted such that the separation element is controllable by the control connection.

This embodiment may, in particular, be advantageous if the separation element is adapted as a shutoff cock. In this case, by providing a control connection, it may be possible for the shutoff cock to be efficiently controlled in the specified manner.

According to yet another exemplary embodiment of the invention the control connection is adapted such that electrical and/or pneumatic lines can be connected. Furthermore, the separation element can be adapted such that the separation element can be controlled electrically and/or pneumatically.

In a further exemplary embodiment the resin trap comprises an output connection, which output connection is preferably adapted such that it can be coupled to a pump.

Coupling the resin trap with a pump may be a particularly effective way of sucking resin into the cavity of the tool. Subsequently, if there is resin in the cavity and thus on/in a component located in the cavity, the pump can be used to pressurise the resin trap. Preferably the pump is a pump that can generate both negative pressure (vacuum) and positive pressure.

According to a further exemplary embodiment the cavity comprises an input connection. By this input connection it may be possible to feed resin into the cavity, for example by negative pressure and/or by positive pressure.

Below, exemplary embodiments of the system with a tool for an RTM method are described. The embodiments that are described in the context of the system also apply to the tool for RTM methods and to the RTM method.

In another exemplary embodiment the system further comprises a control unit that is designed such that it controls a pressure in the resin trap.

By providing a control unit that controls the pressure in the resin trap it may in a simple manner be possible to feed resin into the cavity of the tool, in that, for example, the resin trap is subjected to negative pressure. After the cavity has been filled with resin, the control unit may be operated such that it pressurises the resin trap, wherein such pressure may possibly render unnecessary a shutoff cock as is necessary in prior art. To this effect the control unit may possibly be controlled in such a way that the resin trap is subjected to counter pressure that prevents any further resin from the cavity from penetrating the resin trap.

In a further exemplary embodiment the control unit is adapted such that during a pressure dwell phase (Nachdruckphase) it keeps the resin level in the resin trap constant. Preferably, the control unit is furthermore adapted such that it maintains the pressure in the resin trap during a curing phase.

According to an alternative exemplary embodiment the system further comprises a control element, wherein the control element is adapted such that it controls the separation element. Preferably, in this arrangement the separation element is a shutoff cock which, for example, is pneumatically and/or electrically controllable by the control element.

Below, exemplary embodiments of the RTM method are described. The embodiments described in the context of the RTM method also apply to the tool for the RTM method, and to the system comprising a tool for an RTM method.

In another exemplary embodiment the RTM method furthermore involves increasing the pressure in the resin trap, wherein the increase takes place in a manner that the resin level in the resin trap remains constant.

Increasing the pressure in the resin trap may be an efficient way of preventing further resin from entering the resin trap from the cavity, as a result of which according to an exemplary embodiment of the invention it may be possible to do without a shutoff cock or another shutoff mechanism as is necessary according to prior art.

In a further exemplary embodiment the RTM method further involves maintaining the pressure in the resin trap during a curing phase.

A tool and/or a system according to an exemplary embodiment of the invention can for example be used for producing a component for an aircraft.

It should be pointed out that features or steps which have been described with reference to one of the above exemplary embodiments or with reference to one of the above aspects can also be used in combination with other features or steps of other exemplary embodiments or aspects described above.

One aspect of the invention may consists of a tool comprising an integrated resin trap. As a result of the integral arrangement of such a resin trap it may be possible to avoid connections and connection lines, as a result of which a design of a tool and/or a system for an RTM method may become possible, which design is simplified overall. Between a cavity and the integrated resin trap there may be a separation element that may be designed in the form of a shutoff cock or shutoff valve. By using a suitable geometric shape, for example by a large surface in relation to the volume of the tool or the cavity, it may also be possible to prevent any exothermal reaction that may occur under certain circumstances during curing of the resin, or it may be possible to at least lessen the effects of such an exothermal reaction. As an alternative the separation element may also form a siphon-like transition region that can be used as a shutoff mechanism if the pressure in the resin trap is controlled such that no further resin can enter the resin trap through the transition region. This may, for example, take place by applying overpressure.

SHORT DESCRIPTION OF THE DRAWINGS

Below, the invention is described in more detail by means of exemplary embodiments with reference to the figures, in which identical or similar elements have identical or similar reference signs.

DETAILED DESCRIPTION OF EXEMPLARY EMBODIMENTS

Figure 1:
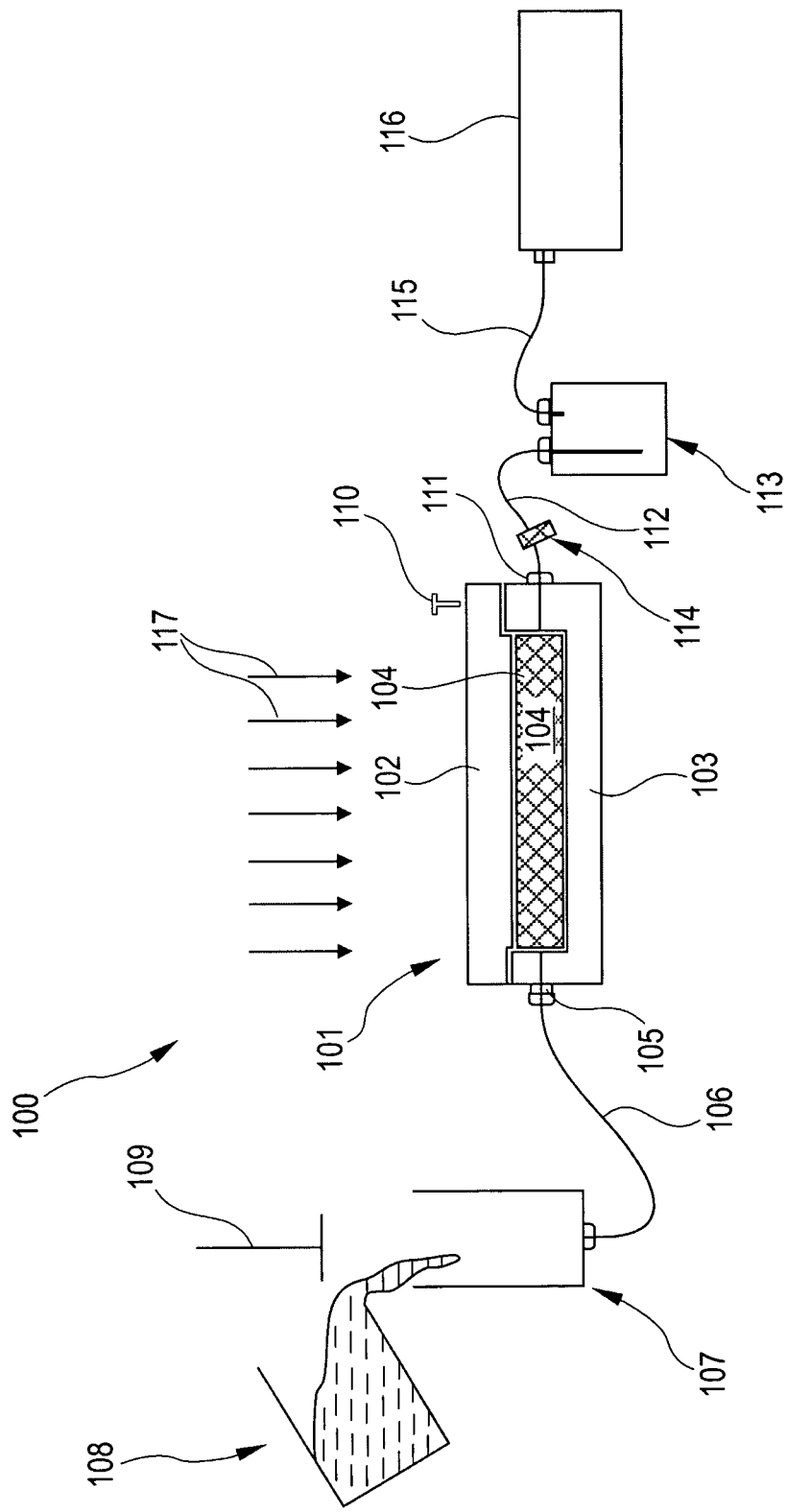
FIG. 1 shows a diagrammatic view of a system for implementing an RTM method.

FIG. 1 shows a diagrammatic view of a system 100 for implementing a resin transfer moulding method (RTM method) that comprises a tool 101 with a mould cover 102 and a mould 103. FIG. 1 also diagrammatically indicates a component 104 that has been placed in the tool 101 and that is to be reinforced with the use of resin. The tool 101 comprises an input connection 105 to which a heating hose 106 is coupled, which is furthermore coupled to a pressure cartridge 107 into which preheated resin from a transport container 108 can be filled. Furthermore, the system 100 comprises a pressure piston 109 that can be placed in the pressure cartridge 107 and which makes it possible for the resin contained in the pressure cartridge 107 to be pressurised such that it can be pushed through the heating hose 106 into the tool 101.

The tool 101 further comprises a closing screw 110 by which the tool 101 can be closed, i.e. by which the mould cover 102 and the mould 103 can be firmly interconnected. Furthermore, the tool comprises an output connection 111 to which a resin hose 112 can be connected. The resin hose 112 is connected to a resin trap 113 and comprises a shutoff cock 114 which is used to close the resin hose 113. Moreover, the resin trap 113 is connected to a vacuum pump 116 by way of an air-hose 115.

An RTM method that can be carried out with the system 100 shown in FIG. 1 comprises the following method steps.

The component 104, e.g. reinforcement fibres that have been cut to size, is placed in the tool 101. Subsequently the tool 101 is closed by the closing screw 110 and is sealed off. In a following step the inlet pipe for the resin 106 and the air hose 115 for the vacuum are connected. By the applied vacuum the resin is transported from the external storage container, i.e. the pressure cartridge 107, which at this point in time is vented to the atmosphere, into the tool 101 to the component 104. Any clogging of the vacuum pump 116 by resin issuing from the tool 101 is prevented by the external resin trap 113 that is arranged upstream of the vacuum pump 116.

In a pressure dwell phase, which is not mandatory, subsequent pressurisation of the resin reduces the size of the pores in the component. To this effect the shutoff cock 114, located between the tool 101 and the resin trap 113, is closed and the residual quantity of resin that is present in the pressure cartridge 107 is pressurised by the piston 109 or by compressed air. Curing, i.e. cross-linking of the resin, takes place by the supply of heat, which is diagrammatically indicated by the arrows 117 in FIG. 1. After completion of curing, the component 104 is removed. After the tool 101 has been cleaned a new component can be placed in it.

Figure 2:
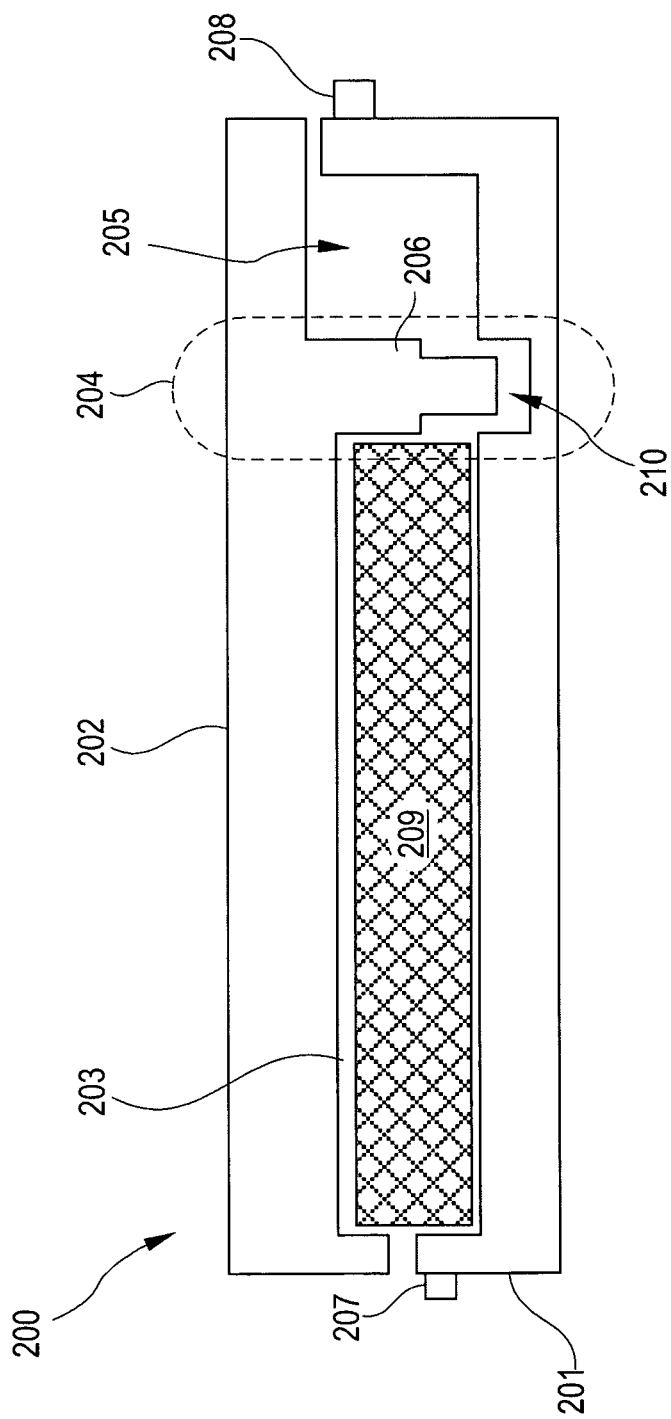
FIG. 2 shows a diagrammatic view of a tool according to a first exemplary embodiment of the invention.

Below, with reference to FIG. 2 a first exemplary embodiment of the invention is described. A tool 200 comprises a mould 201 or mould element (bottom part of the mould) and a mould cover 202 (top part of the mould) that are designed such that they form a first cavity or hollow space 203, a transition region 204, and a second cavity 205 that acts as a resin trap. Integrated in the mould cover 202 is a separation element 206 that is designed such that in the transition region 204 it forms a siphon-like connection region between the cavity 203 and the resin trap 205. In order to design this siphon-like or U-shaped connection region, the mould 201 comprises an indentation which the separation element 206 partly engages. In this arrangement the separation element 206 reaches into the indentation so as to form a siphon 210. Furthermore, the tool 200 comprises an input connection 207 that is coupled to the first cavity 203, by which input connection 207 resin can be fed to the first cavity 203. Moreover, the tool 200 comprises an output connection 208 that is coupled to the resin trap 205 and that is designed such that it couplable to a pump. Furthermore, FIG. 2 diagrammatically shows a component 209 that can be processed using an RTM method.

The separation element 206 can also be designed as a component of the bottom part 201 of the tool so that there is only one connecting channel between the resin trap 205 and the component 209. The separation element 206 can also be designed to be partly a component of the top part 202 of the tool and partly a component of the bottom part 201 of the tool.

Below, with reference to FIG. 3, a system with a tool for an RTM method is described. The system 300 comprises a tool 200, shown in FIG. 2, and essentially differs in that it further comprises an inlet pipe 311 that is coupled to the input connection 207. Moreover, the inlet pipe 311 is coupled to a storage container 312 in which resin 313 is diagrammatically shown. The storage container 312 can be pressurised, which is indicated, by way of an example, by a stamp 314. The pressure can, for example, also be generated by a pump.

Furthermore, the system 300 comprises an outlet pipe 315 that is coupled to the output connection 208. Moreover, the outlet pipe 315 is coupled to a pump 316 that is designed such that it can pressurise the resin trap 205 by way of the outlet pipe 315. On the one hand this pressure can be a negative pressure (vacuum), as a result of which negative pressure resin 313 can be drawn from the storage container 312 through the inlet pipe 311 into the cavity 203. On the other hand this pressure can also be in the form of overpressure or counterpressure which, when the resin trap is partially filled, ensures that no additional resin enters the resin trap, as a result of which it may possibly be superfluous to provide a shutoff element between the cavity 203 and the resin trap 205.

Furthermore, the system 300 comprises a control unit 317, which by way of a first communication line 318 is coupled to the resin trap 205, and by way of a second communication line 319 is coupled to the pump 316. The control unit 317 is designed such that it controls and/or regulates the pressure which impinges on the resin trap 205. To this effect the pressure in the resin trap 205 is measured and, depending on the pressure measured and on the pressure desired, the control unit 317 provides a control signal that controls the pump 316.

Below, there is a description of the way the system described with reference to FIG. 3 can be used in an RTM method. The component 209, e.g. reinforcement fibres cut to size, is placed in the cavity 203 of the tool 200. After this the tool 200 is closed and sealed. In a subsequent step the inlet pipe 311 for resin is connected to the input connection 207, and furthermore an outlet pipe 315, e.g. an air hose, is connected to the output connection 208. By a vacuum applied by way of the air hose 315, or by overpressure applied to one of the inlet pipes 311, resin 313 is sucked, siphoned or pushed from the external storage container 312 into the cavity 203. As soon as there is resin in the internal resin trap 205, said resin trap 205 is pressurised with counterpressure by the pump 316, as a result of which any further ingress of resin into the resin trap 205 is reduced or stopped, and the pump 316 can be protected from any resin entering it. After this, optionally, a so-called pressure dwell phase can be carried out, during which phase the resin in the cavity is pressurised, as a result of which the size of the pores in the component 209 is reduced. If such a pressure dwell phase is carried out, the counterpressure with which the resin trap is pressurised is regulated, e.g. increased, such that the resin level in the resin trap 205 remains constant. To this effect in the region of the resin trap 205 preferably a sensor is affixed, which is coupled to a control unit 317 by a first communication line 318, and which sensor conveys measuring signals to the control unit. From the measuring signals the control unit 317 generates control signals which are conveyed to the pump 316 by a second communication line 319 and which control signals control the output of the pump 316.

Subsequently the resin in the cavity 203 is cured. Such curing takes place by the supply of heat. After completion of curing the component 209 can be removed, the mould 201 can be cleaned and a new component can be placed in it.

Figure 4:
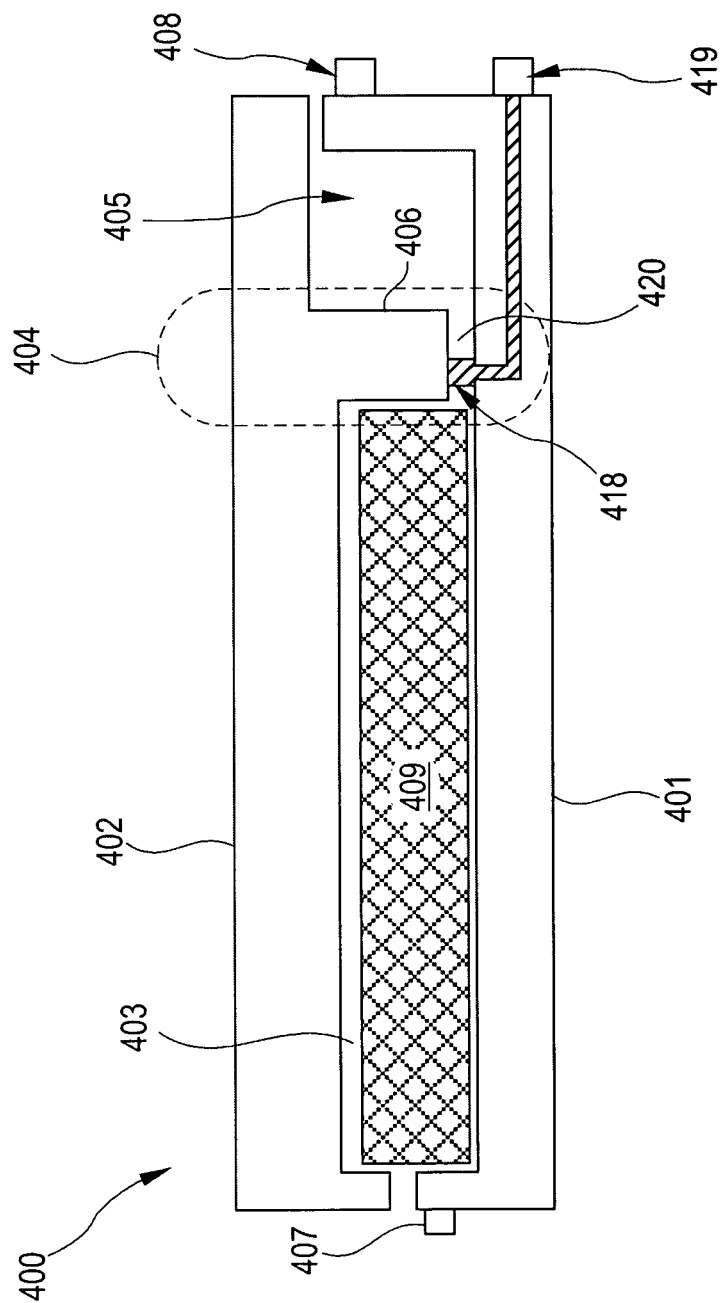
FIG. 4 shows a diagrammatic view of a tool according to a second exemplary embodiment of the invention.

Below, with reference to FIG. 4, a second exemplary embodiment of the invention is described. A tool 400 comprises a mould 401 or mould element and a mould cover 402 that are designed such that they form a first cavity 403, a transition region 404 and a second cavity 405 which is a resin trap. Integrated in the mould cover 402 is a separation element 406 that is designed such that in the transition region 204 it causes partial separation of the cavity 403 from the resin trap 405, as a result of which a connection 420 is established between the resin trap 405 and the cavity 403. Within this connection 420 a shutoff cock or shutoff valve 418 is arranged, which can interrupt the connection 420. In this way the cavity 403 and the resin trap 405 can be completely decoupled from each other, i.e. it is no longer possible for resin to flow from the cavity 403 to the resin trap 405 or vice-versa. For the purpose of controlling the shutoff cock 418 the tool 400 further comprises a control connection 419 by which a control signal can be provided to the shutoff cock 418. This control signal can, for example, be of a pneumatic and/or electrical nature and can be provided by a control element.

Furthermore, the tool 400 comprises an input connection 407 which is coupled to the first cavity 403 and by which input connection 407 resin can be supplied to the first cavity 403. The tool 400 further comprises an output connection 408 which is connected to the resin trap 405 and which is designed such that it can be coupled to a pump. FIG. 4 also diagrammatically shows a component 409 that can be processed in an RTM method.

Figure 3:
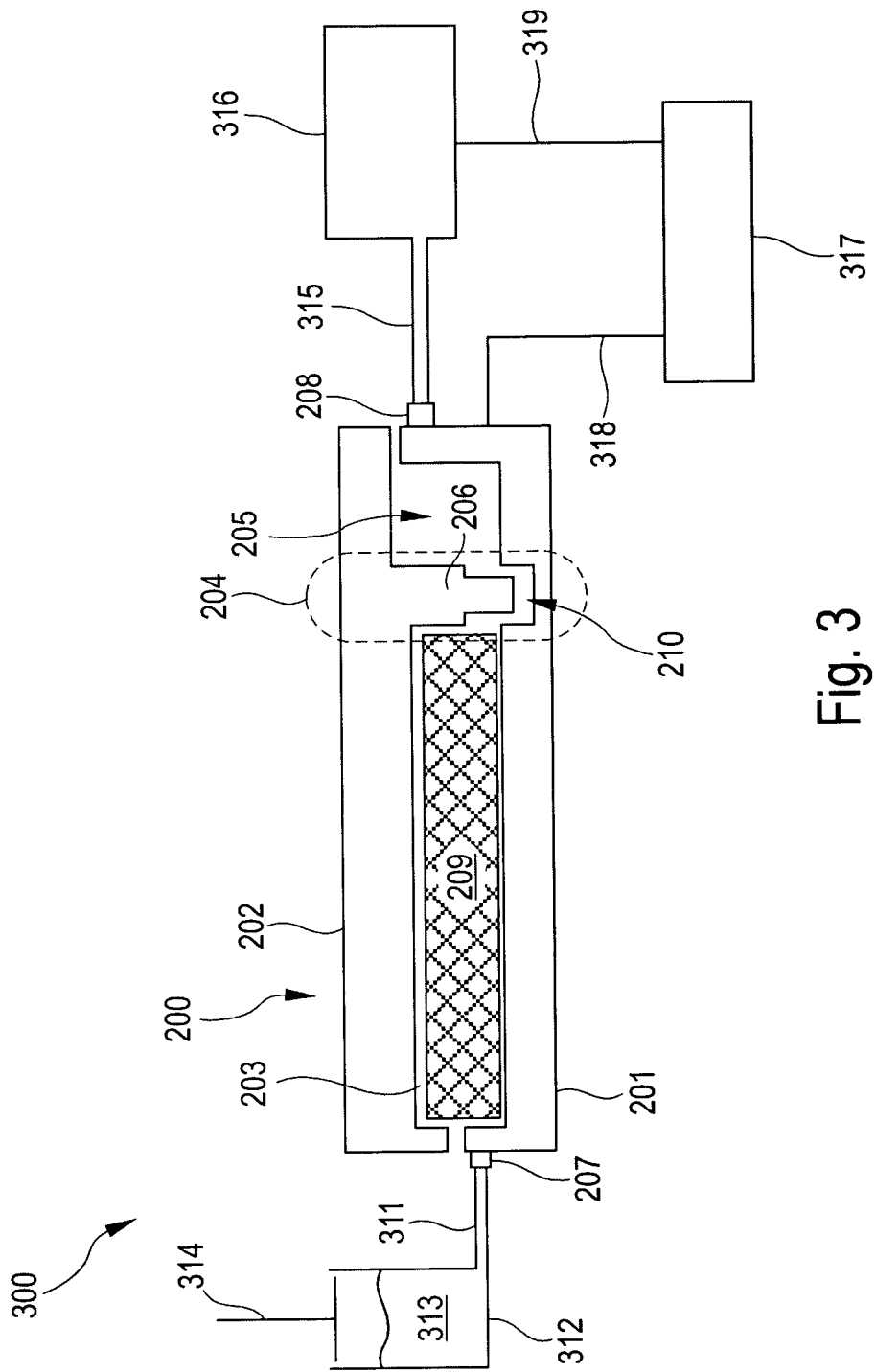
FIG. 3 shows a diagrammatic view of a system for implementing an RTM method.

The tool 400 according to the second exemplary embodiment, too, can be operated in a system as diagrammatically shown in FIG. 3. According to the exemplary embodiment of FIG. 4 only a compressed air connection and/or a control connection for the shutoff cock are required, as a result of which no sealing problems caused by dirty seals can occur, i.e. no resin can emanate from the tool as a result of dirty seals.

In summary, an exemplary aspect of the invention may consists of the creation of a tool for a resin transfer moulding method, which tool comprises an internal resin trap that is integrated in the tool. In other words the resin trap can be designed so as to be integral in the tool, i.e. the resin trap forms an integral part of the tool. In a special exemplary aspect the invention creates a tool and a system for an RTM method, which tool and system obviate the need for a shutoff element or shutoff cock that separates the cavity of the tool from the resin trap.

In addition it should be pointed out that "comprising" does not exclude other elements or steps, and "a" or "one" does not exclude a plural number. Furthermore, it should be pointed out that features or steps which have been described with reference to one of the above exemplary embodiments can also be used in combination with other characteristics or steps of other exemplary embodiments described above. Reference signs in the claims are not to be interpreted as limitations.

The invention claimed is:

1. A tool for a resin transfer moulding method, the tool comprising:
   a mould;
   a mould cover;
   a cavity;
   a resin trap;
   a transition region;
   a pressure means;
   a pressure means connection coupling the resin trap to the pressure means;
   wherein the cavity accommodates a component therein;
   wherein the resin trap is integrated in the tool;
   wherein the transition region establishes a connection between the cavity and the resin trap;
   wherein the transition region comprises a separation element;
   wherein the pressure means is configured at least to positively pressurize the resin trap and wherein the resin trap communicates with the cavity;
   wherein the cavity, the resin trap and the transition region are integrated in the tool and are formed, when the mould and the mould cover are joined;
   wherein the transition region comprises a separation element arranged between the cavity and the resin trap and configured so as to form a siphon-like transition connection between the cavity and the resin trap; and
   wherein the siphon-like transition connection is located below a bottom portion of the resin trap.

2. The tool of claim 1, wherein the separation element is arranged between the cavity and the resin trap such that the separation element at least partly engages the connection between the cavity and the resin trap such that the connection between the cavity and the resin trap is closable at least in part.

3. The tool of claim 2, wherein the separation element is integrated in the mould cover and/or in the mould.

4. The tool of claim 1, wherein the resin trap comprises an output connection.

5. The tool of claim 4, wherein the output connection is couplable to a pump.

6. The tool of claim 1, wherein the cavity comprises an input connection.

* * * * *